Dec. 4, 1973  P. J. McIVER ET AL  3,777,008
SOLID POLYPHOSPHORIC ACID
Filed Nov. 3, 1969
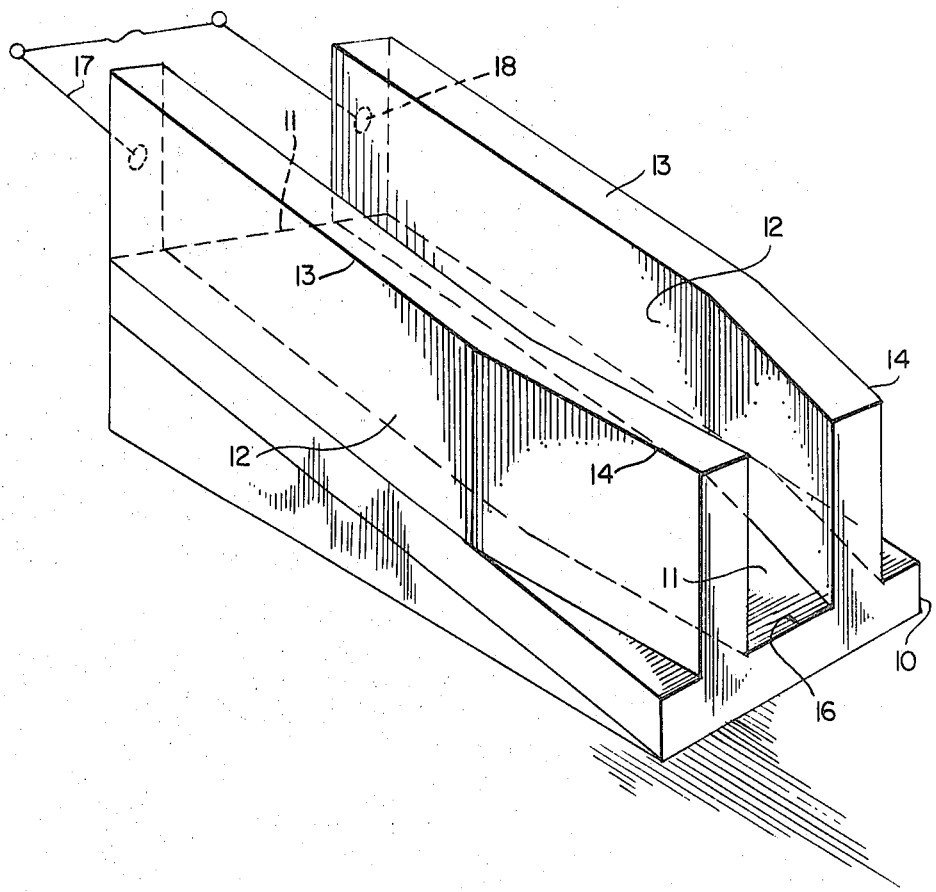
INVENTOR
PETER J. McIVER
BY *Smart & Biggar*
ATTORNEYS

United States Patent Office 3,777,008
Patented Dec. 4, 1973

3,777,008
SOLID POLYPHOSPHORIC ACID
Peter John McIver, Rossland, British Columbia, Canada, assignor to Cominco Ltd., Montreal, Quebec, Canada
Filed Nov. 3, 1969, Ser. No. 873,363
Claims priority, application Canada, Sept. 24, 1969, 63,026
Int. Cl. C01b 25/16, 15/16
U.S. Cl. 423—316                  12 Claims

ABSTRACT OF THE DISCLOSURE

A process for producing a solid completely water-soluble polyphosphoric acid. Wet process phosphoric acid containing a cationic material—a term defined in the disclosure—is passed through an electrothermal cell at an elevated temperature. The concentrated acid is withdrawn from the cell and cooled to yield the desired product. The polyphosphoric acid produced by the process is described. An electrothermal cell in which the process may be carried out is described.

BACKGROUND OF THE INVENTION

(1) Field of the invention

This invention relates to the concentration of wet process phosphoric acid, and more particularly to a completely water-soluble solid polyphosphoric acid as well as to a process for the production thereof.

(2) Description of the prior art

The phosphate industry has for many years realized that great advantages can be obtained by increasing the $P_2O_5$ content of wet process phosphoric acid and many attempts have been made to produce such acid product having a high $P_2O_5$ content. A typical process in use today for concentrating wet process phosphoric acid consists of heating the acid in a liquid body by introducing hot combustion gases through a dip pipe into the body of liquid acid or otherwise heating the liquid acid to remove water. While such processes do increase the concentration of wet process phosphoric acid, it is found that when it is attempted to produce superphosphoric acid containing 70% $P_2O_5$ or more undesirable water insoluble solids are produced.

In U.S. Pat. No. 3,361,187 issued Jan. 2, 1968, it has been recognized that the two principal reasons for the formation of the undesirable solids in polyphosphoric acid in the concentrating processes now in use are: (1) localized over-heating of the acid, and (2) relatively long exposure time at the temperatures necessary for concentration. Attempts were made to eliminate these problems by applying wet process phosphoric acid to the exterior surface of a metal drum, the interior of which was heated. The examples and graphs of this patent do not show a $P_2O_5$ content of over 76% and if the graphs, which both end at 77% $P_2O_5$, could be extrapolated for higher than 77% $P_2O_5$ the product containing more than 77% $P_2O_5$ would contain a very high percentage of solids, i.e., water insoluble materials, as well as a high percentage of citrate insoluble $P_2O_5$. Thus, it is evident that this patent is concerned only with the production of a polyphosphoric acid containing about 70 to 77% $P_2O_5$.

In the process of U.S. Pat. No. 3,403,973 issued Oct. 1, 1968 wet process superphosphoric acid is heated at 600–800° C. for 1 to 120 minutes until a solid product is obtained with a $P_2O_5$ content which is at least 80% water soluble. However, under the conditions shown in the examples, it can be seen that the solid acid is not completely soluble, and even the phosphoric acid used to prepare the solid product is shown to be less than 98% water soluble at a $P_2O_5$ content of only 70%.

It is also well known in the art that the water insoluble material present in polyphosphoric acid and the products made thereof are often citrate insoluble as well. Thus, even a partially insoluble polyphosphoric acid will possess the disadvantages inherent to the presence of insoluble material.

SUMMARY OF THE INVENTION

It is the object of the present invention to provide substantially completely water soluble polyphosphoric acids which are solid at normal atmospheric temperatures and which contain a high percentage of $P_2O_5$.

According to this invention polyphosphoric acids are produced, which are substantially completely soluble in water, which are brittle glassy solids at normal atmospheric temperatures and which contain up to about 82% by weight of $P_2O_5$ and an amount of cationic material providing a ratio of moles of the metallic elements, contained in the cationic material, to moles of $P_2O_5$ of at least 0.18/1.

DESCRIPTION OF PREFERRED EMBODIMENTS

The term cationic material is used in the present disclosure and claims to denote agents which are normally referred to as impurities present in wet process phosphoric acid, as well as agents which supply metallic elements, including the ammonium group which can be added to the wet process acid to provide or enhance the properties of the products made according to the process of the invention.

These polyphosphoric acids are produced by concentrating wet process phosphoric acid containing cationic materials in an electrothermal cell at elevated temperatures with a low retention time. The electrothermal concentration has been found to have the advantage of providing internal heating in the liquid and a consequent even distribution of heat throughout the acid. Thus, the high film temperatures inherent to a device such as a heated drum concentrator are prevented in the process of this invention so that the formation of insolubles can be substantially completely eliminated.

I have found that in order to produce a completely water soluble acid, solid at normal atmospheric temperatures, with a high $P_2O_5$ content, a number of conditions must be satisfied which are interdependent and which determine the properties of the product.

The acid fed to the process may be a dilute wet process phosphoric acid, or a concentrated phosphoric acid containing up to 70% $P_2O_5$ e.g., 55% $P_2O_5$. To make a solid acid, the feed acid should, however, contain a certain amount of cationic material. This cationic material can, for example, be naturally present in the phosphate rock from which the wet process acid is produced. In some cases the wet process acid will contain a sufficient amount of cationic material to enable the production of a satisfactory solid product, but in many cases the cationic material content of wet process acid is too low and it is necessary in those cases to add cationic materials.

A wide variety of these cationic materials may be added to the acid; these comprise one or more elements chosen from the group Al, Fe, Mg, Ca, K, Cu, Mn, Mo, Zn, Co and Na, and $NH_4$. The cationic materials are added in a convenient form, which may include oxides, hydroxides, acids or salts.

Preferably, these cationic materials are added which have a value as a plant-nutrient.

Many of the elements mentioned above and including the ammonium group have value as plant-nutrients and are usually classified as either primary-, secondary- or micro-nutrient-elements. Thus it is possible to produce products which contain these and other nutrient elements, either alone or in a large variety of combinations, and in which these nutrient elements are in a complexed form and evenly distributed throughout the product.

The cationic materials should be present in relatively small amounts, only sufficient to raise the softening point of the solid acid to above normal atmospheric temperatures. The softening point of the solid acid is defined as the temperature above which the solid product shows noticeable deformation under pressure and at which a loss of brittleness occurs. As the level of cationic material increases, there is a decrease in the maximum $P_2O_5$ level at which the product remains substantially completely water soluble.

I believe that the compositions formed in the presence of the cationic materials during concentration, are solid polyphosphoric acids in which the named elements are sequestered; ammonium is believed to be present as ammonium polyphosphate.

The amount of cationic material that must be present to form a solid acid, expressed as the ratio of moles of all metallic elements including nitrogen contained in the cationic material to moles of $P_2O_5$, will usually be higher than about 0.18/1 and preferably will be in the range of about 0.18/1 to about 0.25/1. Ammonium behaves similarly to the cationic materials comprising the elements chosen from the group recited above. The amount of $NH_4$ to be added to a wet process acid prior to concentration to produce a solid product is proportionally higher than the amount of other cationic materials. Thus where $NH_4$ is used in the additional cationic material to produce a solid acid, the mole ratio, as defined above, is preferably in the range of from about 0.25/1 to about 0.50/1, the amount to be added being dependent on the amount of other cationic materials present in the feed acid. Because of the high sequestering power of the polyphosphoric acid, it is possible to include, if desired, amounts of cationic materials considerably above the required minimum before the solid acid is no longer substantially completely water soluble. Also, the addition of cationic materials to the feed acid in amounts above the required minimum will further raise the softening points of the solid products.

It is well known that the impurities present in wet process acid will form insoluble compounds, such as for example aluminum polyphosphate, when the acid is concentrated at high temperatures. Therefore, it is necessary for the successful production of a soluble solid acid, to maintain the temperature of the concentration process as low as possible in order to prevent the formation of insoluble material; yet the temperature must be high enough to enable concentration of the feed acid to a product which will be solid at normal atmospheric temperatures.

I have found that by concentrating a wet process acid in the presence of a sufficient amount of cationic material, to obtain a product which is soluble and solid at normal atmospheric temperatures, the concentration can be performed at lower temperatures than when no or an insufficient amount of cationic material is present. In the presence of amounts of cationic material in excess of said sufficient amount the temperatures of the concentration process are further decreased. Thus the process according to the invention is normally operated at temperatures of up to 600° C. Where cationic material is present in a sufficient amount, the process is normally operated at temperatures within the range of from about 420 to about 580° C., while in the presencee of amounts of cationic material in excess of said sufficient amount, the process may be operated at temperatures below 420° C.

Another factor which influences the formation of insoluble products is the residence time of the acid at high temperatures during concentration. The amount of insoluble material formed during the concentration process increases rapidly with time. Thus, it is necessary to prevent long residence times of the acid in the cell, especially at high temperatures, and not only while the acid is being concentrated, but also after the concentration process.

I have found that the formation of insoluble material during and after the concentration process can be prevented by keeping the retention time of the acid in the cell at a minimum and thereafter rapidly cooling the concentrated acid, thereby minimizing the time at which the acid will be at temperatures at which insoluble material may be formed.

In order to prepare a solid product from wet process acids normally encountered in the industry, it is necessary to concentrate a dilute acid to a very high content of $P_2O_5$. However, the resulting product contains a very high percentage of insoluble material.

I have found that to obtain a product which is both substantially completely soluble and solid at normal atmospheric temperatures, the $P_2O_5$ content that can be obtained is limited.

The higest $P_2O_5$ content which can be obtained to give a solid product which is substantially completely water soluble is about 82% $P_2O_5$. Above 82% $P_2O_5$ the products made from wet process acid no longer met the criterion of solubility. The lowest $P_2O_5$ content which will still give a solid product at normal atmospheric temperature is substantially lower and will depend on the content of cationic material.

The conversion of ortho-phoshate to the non-ortho species in my process is generally in excess of 90% and usually between 94 and 97%.

The concentrated polyphosphoric acid obtained according to this invention forms a hard brittle glass when cooled. This glass has no distinct melting point, but upon heating it will soften and then upon continued heating change into a viscous liquid. The softening of the brittle solid, i.e., loss of brittleness, occurs at a fairly distinct temperature, defined above as the softening point.

The solid polyphosphoric acids obtained according to this invention and having the required minimum mole ratio as defined hereinabove have softening points over a range of temperatures starting at about 50° C. for an acid containing 76% $P_2O_5$, and ranging up to 75° C. for an acid containing 81% $P_2O_5$. Where the solid acids contain cationic materials above the require minimum ratio, the softening point can be as high as 110° C. or higher, while the product is still substantially completely water soluble. Since normal atmospheric temperatures are rarely higher than 40° C., it will be seen that the polyphosphoric acids of this invention clearly remain solid within normal atmospheric temperature ranges.

The concentrated phosphoric acid obtained from the electrothermal cell can be conveniently solidified by prilling in a liquid medium. Hard glassy prills are obtained which remain hard at ambient temperatures and which are substantially completely water soluble. By prilling in a liquid, the liquid acid is solidified rapidly whereby possible formation of insoluble material is prevented.

A wide variety of liquid media can be used for prilling. These must be immiscible with the phosphoric acid and water and must be thermally and chemically stable under the process conditions; also recovery of the liquid should be possible. Among such liquids which have been found to be suitable are low molecular weight chlorinated hydrocarbons, such as trichloroethylene, perchloroethylene and chloroform.

The prills formed in the above liquids were found to be rather hygroscopic and this hygroscopicity can be somewhat reduced by ammoniating the prilling liquid which allows the in-process handling of the product. Because the solubility of ammonia in chloroform is much higher than in tri- or per-chloroethylene, suitable ammoniated prilling liquids were found to be ammoniated chloroform or ammoniated mixtures of chloroform and perchloroethylene.

The ammonia added to the prilling liquid has no appreciable effect as cationic material such as added to the acid feed prior to the concentration step.

The polyphosphoric acid in the solidified state is completely stable with regard to its composition. In particulate form it can be easily handled and stored and does not require pumping facilities or storage tanks. However, because of its hygroscopicity, contact of the product with the atmosphere should be minimized. This can be done by keeping the product in closed containers or packaging it in plastic bags. The softening point of the solid acid is well above the normally encountered atmospheric temperatures and the individual particles will not agglomerate or cake.

The high-analysis, solid, polyphosphoric acid in particulate form is highly soluble in aqueous liquids. Thus the product according to the invention is extremely useful in the preparation of high analysis liquid fertilizers.

During the concentration of the acid in the cell the fluorine content of the acid is reduced to a very low level. The product of the process according to the invention can also be used for preparing animal feed supplements.

The electrothermal cell which is used for the process of this invention must provide a very short residence time and avoid localized over-heating. A successful cell is one which is arranged such that a layer of phosphoric acid is fed down an inclined plane between two graphite electrodes. The inclined passage can suitably be made from high-alumina bricks with graphite side walls acting as the electrodes.

For the purpose of illustration, a suitable electrothermal cell is shown in the accompanying perspective drawing.

Referring to the drawing the bottom of the cell is made up of a number of high-alumina bricks 10 which are cemented together side by side so as to form a rectangular and smooth top surface 11.

On this surface are positioned two elongated and parallel graphite electrodes 12 the outside edges bordering the outside edges of surface 11, and forming the side walls of the cell. The bottoms of the electrodes 12 are bonded to surface 11. Each electrode consists of a straight section 13 and a slightly curved section 14; thus the electrode 12 and surface 11 form a continuous open ended channel 15 of even width between straight sections 13 and which is slightly tapered towards the discharge end 16 of the cell between sections 14 of the electrodes 12.

The electrical lead wires 17 for applying the alternating current to the electrodes are attached to the electrodes at the electrical terminals 18 in the electrodes. The whole cell is mounted in a tilted position with its lowest point being discharge 16 in the tapered end of the channel between the electrodes.

In operating the process according to the invention, phosphoric acid, which contains cationic materials providing a mole ratio of all metallic elements to $P_2O_5$ of at least 0.18 is supplied by feeding means at a constant rate into the highest point of the channel while an A.C. potential is applied by means of the lead-wires from an electrical power supply means to the terminals in the electrodes. For example, single phase 110 volt or 220 volt electrical power may be used.

The acid flows as a layer through the channel between the electrodes and becomes increasingly concentrated due to the conversion of the electrical energy into thermal energy within the layer of acid. By gradually decreasing the width of the channel through which the acid flows, the rate of heat input into the acid layer gradually incerases as the acid progresses and consequently the rate of concentration is accelerated.

Simultaneously the rate of flow of the acid layer increases due to the reducing width of the channel, so that the residence time of the acid in the section of the cell wherein the highest temperatures occur is gradually reduced. The increase in flow rate more than outweighs the decrease in the volume caused by the removal of vapours from the acid.

The accelerated rate of concentration and the decreasing of the retention time result in the substantial prevention of the formation of insoluble material in the acid.

The concentrated acid falls freely from the discharge end of the cell into a prilling vessel containing an ammoniated prilling liquid, while a small amount of ammonia is sparged into the bottom of the prilling vessel. The stream of concentrated acid breaks up in droplets which solidify and form hard spherical prills of solid acid.

The prills are then separated from the bulk of the prilling liquid; this can conveniently be accomplished by centrifuging. The prilling liquid is recovered from the separation step and returned to the prilling vessel. The residual prilling liquid adhering to the prills after the separation from the bulk of the prilling liquid is removed by a stream of drying air or dry gaseous ammonia.

The cell used in all of the following examples, and according to the accompanying figure and the description given above, was 18 inches long and 3½ inches wide, the electrodes were 1 inch thick graphite and slightly curved over a length of 6 inches. The channel between the electrodes was 1½ inches wide at the feed point and ¾ inches wide at the discharge point of the acid. The cell was tilted 1½ inches at its feed point. Retention time of the acid in this cell was about 15 seconds while the retention time of the acid in the section formed by the converging electrodes was less than 5 seconds.

EXAMPLE I

In the cell as described above a wet process phosphoric acid, containing about 52% by weight $P_2O_5$ and containing an amount of cationic material naturally present in this acid in a mole ratio of 0.17, expressed as moles of elements over moles $P_2O_5$, was concentrated to a $P_2O_5$ content of 78.8% at a temperature of 500° C. in the discharge end of the cell. It was not possible to solidify this concentrated acid into a solid product with a sufficiently high softening point. The analysis of the wet process acid feed is shown in Table I.

TABLE I

Percent by weight:

| | |
|---|---:|
| T/$P_2O_5$ | 51.9 |
| $SO_4$ | 2.4 |
| F | 1.2 |

Mole ratio: metallic element/$P_2O_5$:

| | |
|---|---:|
| Al | 0.090 |
| Fe | 0.045 |
| Mg | 0.010 |
| Ca | 0.014 |
| Na | 0.006 |
| K | 0.004 |
| Total | 0.17 |

EXAMPLE II

A wet process phosphoric acid containing naturally present cationic material in a mole ratio of cationic materials, expressed as the metallic elements to $P_2O_5$, of 0.18, was concentrated according to the process of the invention. It was shown possible to produce a solid acid from this feed acid by concentrating the acid at a temperature of 510° C. at the discharge end of the electrothermal cell. The product, analyzing 78.4% by weight of T/$P_2O_5$ (total $P_2O_5$) and 78.2% by weight of WS/$P_2O_5$ (water soluble $P_2O_5$) was "marginally solid," and had a low softening point of about 30° C. Increasing the concentration temperature in the cell to about 550° C. the acid yielded a solid product, which however contained some insoluble material.

This wet process acid is marginal in the production of a solid and soluble acid. The analysis of the wet process feed acid is shown in Table II.

TABLE II

Percent by weight:
- T/$P_2O_5$ ---- 43.9
- $SO_4$ ---- 2.0
- F ---- 1.7

Mole ratio: metallic element/$P_2O_5$:
- Al ---- 0.073
- Fe ---- 0.072
- Mg ---- 0.016
- Ca ---- 0.016
- Na ---- 0.005
- K ---- 0.003

Total ---- 0.18

EXAMPLE III

A wet process phosphoric acid containing about 54% by weight $P_2O_5$ and containing an amount of cationic materials, naturally present in the acid, in a mole ratio of 0.24 was fed to the electrothermal cell shown in FIG. 1 at a constant rate of 3300 grams/hour. The analysis of the acid is given in Table III.

TABLE III

Percent by weight:
- T/$P_2O_5$ ---- 53.9
- $SO_4$ ---- 2.7
- F ---- 1.1

Mole ratio: metallic element/$P_2O_5$:
- Al ---- 0.083
- Fe ---- 0.030
- Mg ---- 0.094
- Ca ---- 0.013
- Na ---- 0.011
- K ---- 0.007

Total ---- 0.24

The temperature of the feed acid was 30° C. An A.C. potential was applied at the electrodes for a power input of 1700 watts. The temperature in the cell was measured at the discharge point of the concentrated acid by direct immersion of a Pt/Pt-Rh thermocouple in the acid. The acid was concentrated to about 77% by weight $P_2O_5$ and the temperature was approximately 440° C., as measured. Even boiling and consequent good mixing of the acid across the cell took place. The retention time of the acid in the whole cell was approximately 15 seconds, while that in the tapered section of the cell was less than 5 seconds.

The concentrated acid from the cell was prilled into an ammoniated mixture of chloroform and perchloroethylene in a 1:1 ratio, while gaseous ammonia was sparged into the ammoniated mixture. Excellent prills were obtained, which were about 90% —6+14 mesh size. These prills were clear green in colour, very hard, 100% water soluble, contained about 77% by weight $P_2O_5$ and had a softening point of 50° C.

EXAMPLE IV

To the acid used in Example I was added an amount of KCl, bringing the mole ratio of metallic elements to $P_2O_5$ to 0.24.

This acid was then concentrated according to the process of the invention and the concentrated acid was prilled in an ammoniated mixture of chloroform and perchloroethylene.

The temperature of the concentrated acid measured at the point of discharge from the cell was 500° C.

The chlorine contained in the KCl was drawn off as HCl.

Solid and brittle prills were formed which were completely soluble in water and which analyzed 76.5% by weight $P_2O_5$.

EXAMPLE V

The acid used in Example III was concentrated at varying temperatures and the results are tabulated in Table IV.

TABLE IV

| Concentration temperature, °C. | Analysis of the solid acid, percent by wt. | | Conversion to non ortho $P_2O_5$, percent | Softening point °C. |
|---|---|---|---|---|
| | T/$P_2O_5$ | WS/$P_2O_5$ | | |
| 420 | | | | (1) |
| 440 | 76.4 | 76.1 | 92 | 53 |
| 480 | 78.7 | 78.3 | 95 | 62 |
| 520 | 79.3 | 78.9 | 95 | 69 |
| 570 | 80.0 | 79.4 | 97 | 74 |
| 570 | 80.9 | 80.0 | 97 | 74 |

[1] Not solid.

As can be seen from the above results, the concentration at 420° C. did not yield a solid product. At temperatures above 420° C. and up to about 570° C. the product was a clear green, hard and brittle solid which was substantially completely water soluble, that is better than 99% water soluble.

Table IV shows that by using different temperatures for the concentration, substantially completely water soluble solid polyphosphoric acids can be made with a $P_2O_5$ content of from about 76 weight percent to about 81 weight percent having a conversion of the $P_2O_5$ content to the non-ortho form of better than 92% and which have softening points ranging from 53° C. to 74° C.

EXAMPLE VI

In this example it will be shown that, in order to produce a solid polyphosphoric acid from wet process acid, it is necessary that the acid contains a certain minimum amount of cationic materials. To furnace grade phosphoric acid containing 50% by weight $P_2O_5$ were added varying amounts of cationic materials which are normally present in wet process phosphoric acid and the acids so obtained were concentrated using the process of the invention. In every test was added 2.3 weight percent $H_2SO_4$, 2 weight percent $H_2SiF_6$ and varying amounts of Al, Fe, Ca and Mg in the form of their oxides. The results are listed in Table V.

It follows from the results in Table V that, in order to produce a solid product which is substantially completely water soluble and using the apparatus described, the concentration should be performed at below about 600° C. and the acid should contain cationic materials in a molar ratio of the metallic elements in the cationic materials to $P_2O_5$ of at least 0.18. The results also show that the upper limit of the $P_2O_5$ content of the solid products is about 82% $P_2O_5$.

In this case using acid containing 50% by weight $P_2O_5$, the mole ratio of 0.18 corresponds to about 2.3% by weight of cationic material expressed as oxides.

TABLE V

| Cationic materials, mole ratio metallic element/$P_2O_5$ | | | | | Percent by weight | | | Concentration temperature, °C. | Comments |
| --- | --- | --- | --- | --- | --- | --- | --- | --- | --- |
| Al | Fe | Mg | Ca | Total | T/$P_2O_5$ | WS/$P_2O_5$ | Non ortho [1] $P_2O_5$ | | |
| 0 | 0 | 0 | 0 | | | | | 700 | Not solid. |
| 0.056 | 0.051 | 0 | 0.014 | 0.12 | | | | 625 | Do. |
| 0.056 | 0.051 | 0.035 | 0.014 | 0.16 | | | | 615 | Solid.[2] |
| 0.084 | 0.051 | 0.035 | 0.014 | 0.18 | | | | 580 | Do.[2] |
| 0.111 | 0.051 | 0.035 | 0.014 | 0.21 | 79.3 | 78.9 | 95 | 500 | Do. |
| 0.056 | 0.051 | 0.071 | 0.014 | 0.19 | 80.3 | 80.1 | 96 | 515 | Do. |
| 0.056 | 0.051 | 0.106 | 0.014 | 0.23 | 79.6 | 79.7 | 95 | 500 | Do. |
| 0 | 0.051 | 0.142 | 0.014 | 0.21 | 82.4 | 81.9 | 97 | 530 | Do. |
| 0 | 0 | 0.212 | 0.014 | 0.23 | 82.0 | 80.9 | 96 | 520 | Do. |

[1] Percent by weight of total $P_2O_5$.
[2] The solid product was not entirely clear.

EXAMPLE VII

This example illustrates the possibility of including various cationic materials including $NH_4$ in commercial grades of wet process acid up to and in excess of the minimum required mole ratio to make a solid polyphosphoric acid and obtain substantially completely water soluble products with softening points as high as 110° C. Additions of the cationic materials were made to the dilute wet process phosphoric acid feed before the concentration in the cell.

Nitrogen was added as ammonium phosphate, potassium was added as KCl, molybdenum was added as molybdic acid and the other elements were added in the form of oxides.

Because the power input to the cell was varied, the temperatures in the cell varied and consequently the products have different $P_2O_5$ contents and different softening points. The test results are listed in Table VI.

All products formed hard brittle prills which had a solubility of from 99.5% to 100%. The amounts of added cationic materials are not the highest amounts possible, neither is the T/$P_2O_5$ content of each product the highest obtainable. Thus this example only illustrates that it is possible to include primary, secondary- and micro-nutrient elements even above the minimum required mole ratio, to produce soluble solid polyphosphoric acids.

TABLE VI

| Added cationic material as element, percent by wt.[1] | Mole ratio metallic elements/$P_2O_5$ | Concentration temperature, °C | Percent by wt. | | Conversion to non ortho $P_2O_5$, percent | Softening point, °C. |
| --- | --- | --- | --- | --- | --- | --- |
| | | | T/$P_2O_5$ | WS/$P_2O_5$ | | |
| None | 0.24 | 440 | 76.9 | 76.7 | 93 | 50 |
| Do | 0.24 | 540 | 80.5 | 80.1 | 95 | 60 |
| 0.6% Mg [2] | 0.24 | 500 | 77.9 | 77.5 | | |
| 0.9% Mg | 0.35 | 440 | 75.4 | 75.0 | 86 | 75 |
| 2.9% Mg [2] | 0.51 | 420 | 72.0 | 72.0 | 85 | 110 |
| 2.9% Ca [2] | 0.37 | 500 | 70.4 | 70.2 | 93 | 80 |
| 1.1% N | 0.47 | 430 | 74.8 | 74.7 | 90 | 60 |
| 1.0% N | 0.45 | 490 | 79.4 | 79.4 | 96 | 60 |
| 2.8% N | 0.80 | 435 | 73.4 | 73.1 | 94 | 70 |
| 2.9% K | 0.45 | 510 | 75.7 | 75.5 | 95 | |
| 4.8% K | 0.59 | 425 | 72.2 | 72.1 | 93 | |
| 11.1% K | 1.05 | 335 | 62.2 | 62.2 | 69 | 50 |
| 2.8% Fe | 0.38 | 440 | 71.8 | 71.8 | 86 | 100 |
| 6.0% Zn | 0.50 | 440 | 69.6 | 69.5 | 87 | |
| 3.5% Co | 0.41 | 430 | 73.1 | 73.1 | 94 | 90 |
| 6.7% Mn | 0.59 | 505 | 59.3 | 59.3 | | 100 |
| 2.3% Cu | 0.34 | 430 | 72.5 | 72.2 | 87 | 60 |
| 4.3% Cu | 0.43 | 500 | 72.6 | 72.6 | 90 | |
| 3.9% Mo | 0.35 | 460 | 68.2 | 68.1 | 83 | 60 |

[1] On the basis of 50% $P_2O_5$ in the feed acid.
[2] Added to the acid of Example I.

What I claim as my invention is:

1. A process for producing a solid polyphosphoric acid having a water solubility of at least 98 percent which consists of passing wet process phosphoric acid containing cationic material present in a ratio of moles of metallic elements to moles of $P_2O_5$ of from at least about 0.18 to 1.05, said cationic material comprising at least one member selected from the group consisting of Al, Fe, Mg, Ca, K, Cu, Mn, Mo, Zn, Co, Na, and $NH_4^+$ through an electrothermal cell, applying an alternating current potential to said acid whereby said acid becomes concentrated, controlling said potential to maintain the temperature of said acid from 335° to below about 600° C., passing said acid through the cell at a rate sufficient to prevent the formation of water insoluble material and cooling the concentrated acid.

2. A process for producing a solid polyphosphoric acid having a water solubility of at least 98.7 percent which consists of passing wet process phosphoric acid containing cationic material present in a ratio of moles of metallic elements to moles of $P_2O_5$ of from at least about 0.18 to 1.05, said cationic material comprising at least one member selected from the group consisting of Al, Fe, Mg, Ca, K, Cu, Mn, Mo, Zn, Co, Na and $NH_4^+$, and said cationic material being present in an amount sufficient to raise the softening point of the solid acid above normal atmospheric temperature, through an electrothermal cell at a temperature from 335° to below about 600° C. with a retention time insufficient to cause the formation of water insoluble material to concentrate said wet process phosphoric acid to a $P_2O_5$ content in said solid acid of up to about 82%, applying an alternating current potential to said acid whereby said acid becomes concentrated, and immediately cooling the concentrated acid to form solid, substantially completely water-soluble polyphosphoric acid.

3. A process according to claim 1 wherein the solid polyphosphoric acid has a water solubility of at least 98.7 percent.

4. A process according to claim 1 wherein at least a portion of said cationic material is added to the wet process phosphoric acid prior to passing said acid through the electrothermal cell.

5. A process according to claim 2 wherein the solid acid has a total $P_2O_5$ content in the range of from about 76% to about 82% by weight.

6. A process according to claim 2 wherein the temperature of the acid passing through the cell is in the range of from about 420° C. to about 580° C.

7. A process according to claim 2 wherein the cationic material is present in an amount sufficient to raise the softening point above about 40° C.

8. A process according to claim 4 wherein the cationic material comprises the $NH_4$ group, which is present, expressed in a ratio of moles nitrogen to moles $P_2O_5$, of between about 0.25 and about 0.50.

9. A process according to claim 4 wherein the added portion of the cationic material comprises plant nutrient elements.

10. A process according to claim 1 wherein the concentrated acid is cooled as spherical prills.

11. A process according to claim 1 wherein the concentrated acid is cooled as spherical prills in a liquid prilling medium comprising ammoniated low molecular weight hydrocarbons of the group comprising chloroform, trichloroethylene or perchloroethylene or mixtures thereof.

12. A process according to claim 1 wherein the wet process acid is continuously fed to said electrothermal cell and is heated and concentrated as it flows as a layer down an inclined channel between converging electrodes, and hot concentrated acid is continuously withdrawn from said cell.

References Cited

UNITED STATES PATENTS

| | | | |
|---|---|---|---|
| 3,192,013 | 6/1965 | Young | 23—165 |
| 870,211 | 11/1905 | Zaremba. | |
| 3,315,681 | 4/1967 | Poppendiek. | |
| 3,403,973 | 10/1968 | Lee et al. | 23—109 |
| 3,482,945 | 12/1969 | Legal | 23—259.2 |
| 3,656,897 | 4/1972 | White et al. | 23—165 |

FOREIGN PATENTS

| | | | |
|---|---|---|---|
| 1,220,020 | 1/1960 | France | 23—165 |

OSCAR R. VERTIZ, Primary Examiner

G. A. HELLER, Assistant Examiner

U.S. Cl. X.R.

71—43; 423—305